(12) United States Patent
Madanat

(10) Patent No.: US 10,470,611 B2
(45) Date of Patent: Nov. 12, 2019

(54) DISPOSABLE FRYING OIL FILTER AND FILTER SECURING DEVICE

(71) Applicant: Azmie Khalaf Madanat, Moraga, CA (US)

(72) Inventor: Azmie Khalaf Madanat, Moraga, CA (US)

(*) Notice: Subject to any disclaimer, the term of this patent is extended or adjusted under 35 U.S.C. 154(b) by 38 days.

(21) Appl. No.: 15/213,642

(22) Filed: Jul. 19, 2016

(65) Prior Publication Data

US 2018/0020874 A1    Jan. 25, 2018

(51) Int. Cl.
*A47J 37/12*   (2006.01)
*A23L 5/10*    (2016.01)
*A23D 9/02*    (2006.01)

(52) U.S. Cl.
CPC ............ *A47J 37/1223* (2013.01); *A23D 9/02* (2013.01); *A23L 5/11* (2016.08); *A47J 37/1271* (2013.01); *A23V 2002/00* (2013.01); *A47J 37/1295* (2013.01)

(58) Field of Classification Search
CPC ......... B01D 35/02; B01D 35/027; A23L 5/11; A47J 37/1223; A47J 37/1271; A47J 37/1295; A23D 9/02; A23V 2002/00
USPC ................... 426/438–441; 99/403–418, 450; 210/167.28
See application file for complete search history.

(56) References Cited

U.S. PATENT DOCUMENTS

| | | | | |
|---|---|---|---|---|
| 1,814,784 A | * | 7/1931 | Bennett | A47J 37/1295 220/23.87 |
| 3,495,525 A | * | 2/1970 | Piotrowski | A47J 37/1223 99/403 |
| 3,831,766 A | * | 8/1974 | Newman | B01D 39/1623 210/508 |
| 3,933,645 A | * | 1/1976 | Keramidas | A47J 37/1223 210/305 |
| 3,977,390 A | * | 8/1976 | Fogel | A47J 37/1233 126/374.1 |
| 4,052,319 A | | 10/1977 | Friedman | |
| 4,448,686 A | | 5/1984 | Friedman | |
| 4,462,915 A | | 7/1984 | Friedman | |
| 4,517,887 A | * | 5/1985 | Childress | A47J 37/1295 99/426 |
| 4,542,684 A | * | 9/1985 | Cantrell | A47J 37/1295 211/181.1 |

(Continued)

FOREIGN PATENT DOCUMENTS

EP       0226413 A2    6/1987
EP       0278080 A1 *  8/1988  ............. A47J 31/08

(Continued)

*Primary Examiner* — Drew E Becker
(74) *Attorney, Agent, or Firm* — Sierra IP Law, PC; Jared Christensen

(57) ABSTRACT

The present invention is an apparatus comprising a disposable frying oil filter and a filter securing element, and a method of using the same. The disposable filter is adapted to cover the sides and base of a fryer basket and allow oil to pass though at a substantially similar rate to a filterless fryer basket, while trapping virtually all small particles released from a cookable item. The filter securing device is preferably a frame attached to the fryer basket, and is adapted to hold the disposable filter in place and allow for easy replacement when the disposable filter becomes saturated with small particles.

20 Claims, 9 Drawing Sheets

(56) References Cited

U.S. PATENT DOCUMENTS

| | | | | |
|---|---|---|---|---|
| 4,604,203 A * | 8/1986 | Kyle | ............ | A47J 37/1223 210/489 |
| 5,033,369 A * | 7/1991 | Wu | ............ | A47J 37/1295 210/167.28 |
| 5,072,664 A * | 12/1991 | Tienor | ............ | A47J 37/1295 99/353 |
| 5,247,876 A | 9/1993 | Wilson et al. | | |
| 5,359,924 A * | 11/1994 | Roberts | ............ | A21B 5/08 99/411 |
| 5,782,164 A * | 7/1998 | Brintle | ............ | A47J 37/1223 99/330 |
| 6,095,037 A | 8/2000 | Savage et al. | | |
| 6,176,175 B1 * | 1/2001 | Moreth | ............ | A47J 37/1295 99/408 |
| 6,591,741 B1 * | 7/2003 | Martin | ............ | A47J 37/1271 126/390.1 |
| 6,732,636 B1 * | 5/2004 | Germano | ............ | A47J 36/22 99/403 |
| 7,021,202 B2 * | 4/2006 | Sizer | ............ | A47J 37/129 220/573.2 |
| 7,137,419 B1 * | 11/2006 | Reeves | ............ | B01D 29/085 141/340 |
| 8,307,759 B2 * | 11/2012 | Ketter, Jr. | ............ | A47J 37/1295 210/455 |
| 9,016,190 B2 * | 4/2015 | Webb | ............ | A47J 37/1204 99/418 |
| 2002/0069767 A1 * | 6/2002 | Wendel | ............ | A47J 37/1223 99/403 |
| 2006/0156926 A1 * | 7/2006 | Alemao | ............ | A61L 9/014 96/108 |
| 2007/0137497 A1 | 6/2007 | Savage et al. | | |
| 2008/0220132 A1 * | 9/2008 | Taminich | ............ | A21B 5/026 426/138 |
| 2011/0288319 A1 * | 11/2011 | Profughi | ............ | A47J 37/1223 554/175 |
| 2013/0008320 A1 | 1/2013 | Kilmer | | |
| 2013/0029021 A1 * | 1/2013 | Ketter, Jr. | ............ | A47J 37/1295 426/438 |
| 2014/0170918 A1 * | 6/2014 | Angus, Jr. | ............ | C03C 25/32 442/175 |
| 2015/0335201 A1 * | 11/2015 | Hobbs | ............ | A47J 37/1295 99/408 |
| 2017/0280936 A1 * | 10/2017 | Birkmanis | ............ | A47J 37/1223 |

FOREIGN PATENT DOCUMENTS

| | | | | |
|---|---|---|---|---|
| GB | 716450 | * | 10/1954 | |
| GB | 2046085 A | * | 11/1980 | ......... A47J 37/1223 |
| GB | 2067085 A | * | 7/1981 | ......... A47J 37/1223 |
| GB | 2209684 A | * | 5/1989 | ......... A47J 37/1223 |
| GB | 2427154 A | * | 12/2006 | ......... A47J 37/1223 |
| GB | 2430862 A | * | 4/2007 | |
| JP | 06030868 A | * | 2/1994 | ......... C09D 133/06 |

* cited by examiner

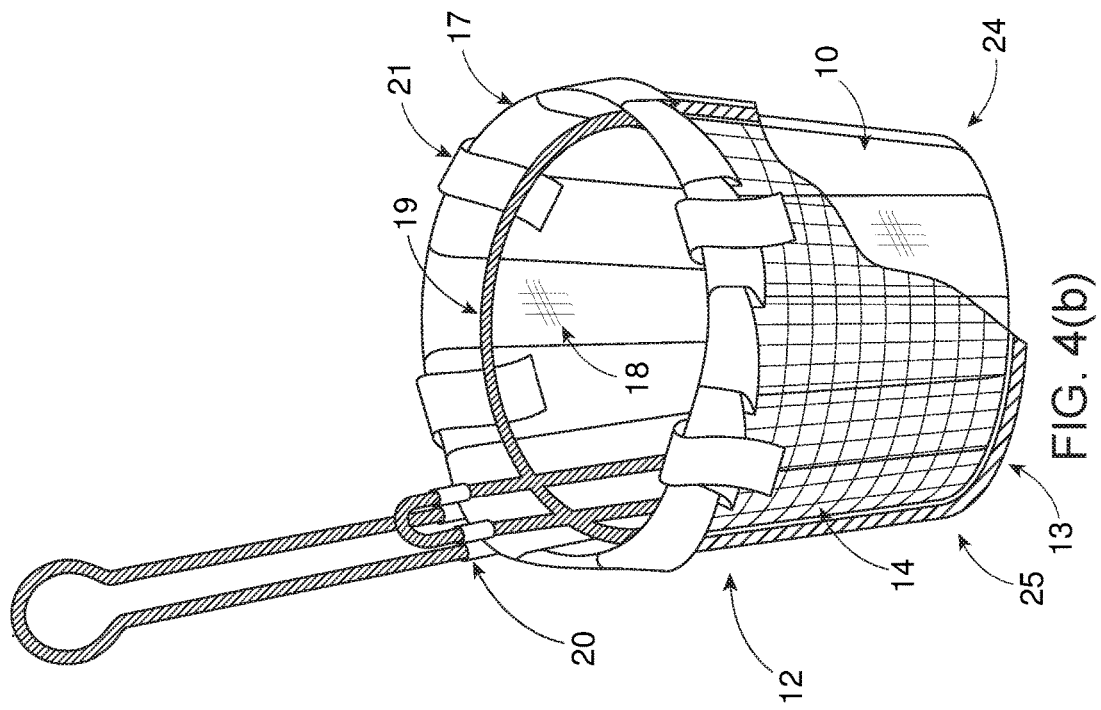
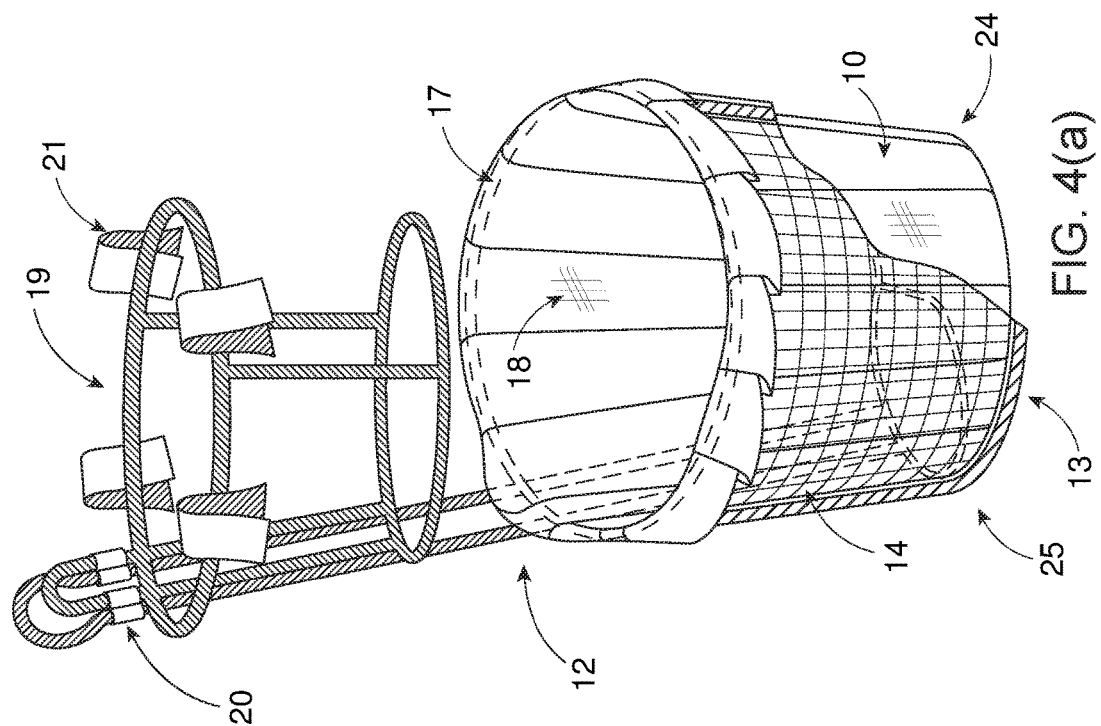

DISPOSABLE FRYING OIL FILTER AND FILTER SECURING DEVICE

CROSS-REFERENCE TO RELATED APPLICATIONS

Not Applicable.

BACKGROUND OF THE INVENTION

Various embodiments of the present invention generally relate to filtration of frying oil used for cooking food and methods of filtering such frying oil, and more particularly to a new and improved apparatus and method for filtering small particles from frying oil in a deep oil fryer as the frying oil drains from a frying basket.

The invention is particularly applicable to filtering of frying oil in a deep fryer with a disposable filter securely attached to a fryer basket, and will be described with particular reference thereto. However, those skilled in the art will appreciate that the invention has broader applications and may also be adapted for use as a filtering device in industrial filtering of oil or other mediums, filtering of scientific reagents and products, and the like.

Currently, the common practice in the field of deep frying food is to utilize a metal frying basket to enclose the food product while immersing and cooking the food product in a pool of heated frying oil, and subsequently draining the frying oil from the food product when it is finished cooking. The metal frying basket is comprised of a metal mesh base and metal mesh sides, each made from woven wire with openings large enough to allow for quickly draining the frying oil from the basket, but also large enough to allow small particles of the food product in the basket to permeate into the pool of heated frying oil.

The small particles remain in the pool of frying oil, being continually cooked at or around 375° Fahrenheit during operation, and becoming carbonized and less healthy for human consumption as time passes. After multiple repetitions of the cooking process in the same frying oil, the small particles cause the pool of frying oil to become darkened and begin to impart a burnt flavor and color to the food product. Thus, to maintain a consistent, high-quality, and healthy food product, a food service business must either sufficiently filter or change its frying oil on a frequent basis. Yet, changing or filtering frying oil under current methods represents a significant cost to the food service business in both labor and frying oil.

The least complex previously utilized method for preventing a decline in the quality of fried food involves draining the used frying oil and replacing it with fresh frying oil. This method is not preferable as it involves a high cost for frying oil. Also, if this method is performed during operating hours in order to prevent serving low quality food, it is both dangerous and represents down time for food preparation, further cutting into the profit margin of a food service business.

Another currently utilized method for filtering frying oil is to drain the frying oil and pour it through a filtering funnel into a receiving container before returning it to the frying oil pool. See U.S. Pat. No. 4,462,915. The fryer must also be cleaned, as the small particles of food product collect at the bottom of the frying oil pool. This method is generally performed after operating hours, when the oil has cooled, in order to maintain safe working conditions. This method is also undesirable as it is both labor intensive and it allows the frying oil to become dirty, resulting in a decline in the quality of the food product as the day progresses.

A third method utilizes a pump which sucks oil from the pool of heated frying oil and pushes it through an enclosed filter, and back into the pool of heated frying oil. See U.S. Pat. Application Pub. No. 2007/0137497 A1; U.S. Pat. No. 5,782,164 A; U.S. Pat. No. 6,095,037 A. This method not preferable because it requires a more complex and expensive deep fryer, as well as periodic maintenance on the deep fryer in order to change or clean the enclosed filter. Further, performing maintenance on the filter or pump during operation in order to quickly fix a problem involves the added danger of working with hot oil. Extra parts and added maintenance of the deep fryer also increases the likelihood of frying oil leaking onto the ground and compromising workplace safety.

Utilizing metal frying baskets or liners with a tighter mesh of metal wires in its base and sides is of limited use because it represents a trade-off between the time required to drain the oil, and filtering of smaller particles. See U.S. Pat. No. 8,307,759 B2. Here, the tighter the wire mesh becomes, the smaller the particles that the mesh can filter, and the longer the frying oil pool remains pure. However, tighter wire mesh also means slower draining of the frying oil from the frying basket once the food product is finished cooking. This method is thus not preferable as it slows down food service and represents a potential safety hazard while heated frying oil drains from a hand-held frying basket.

Further, utilizing current frying oil filters comprising mainly polyester materials (U.S. Pat. No. 4,462,915) is not preferable as the filters are hydrophobic in nature. Hydrophobic material attracts the hydrophobic lipid molecules of frying oil to the fibers of the filter via hydrophobic bonds, and slows the process of filtering the frying oil through the polyester filter. A filter made primarily from hydrophilic fibers such as rayon does not attract the hydrophobic molecules of frying oil and thus allows for more efficient filtering.

Another undesirable aspect of current polyester filters is that they are not designed to be disposable and easily removed, but require a laborious process of removal and cleaning. An easily attached and removed filter securing device, coupled with a hydrophilic disposable filter, would cut down on filter servicing costs. Currently utilized deep fryer baskets comprise no such securing device.

What is needed is a low maintenance apparatus which safely and efficiently secures a disposable filter made from hydrophilic materials into a fryer basket, allowing for quick and safe replacement of the disposable filter. Such an apparatus would in turn prevent small particles of food product from lingering in the pool of frying oil, preserving food quality and reducing cost by extending the life of the frying oil.

BRIEF SUMMARY OF THE INVENTION

The present invention is directed to a disposable filter which is adapted to cover a base and a side of a fryer basket for a deep fryer, a filter securing element which is adapted to efficiently secure the disposable filter in place, and a method for using the filter securing element and disposable filter.

It is an object of the present invention to provide an improved apparatus and method for filtering frying oil to prevent small particles released from a cookable item from lingering and becoming overcooked or carbonized in the heated frying oil, thus extending the life of the frying oil and maintaining the quality of a subsequently cooked cookable item. In an embodiment of the invention the cookable item comprises a food product. In another embodiment the food product is selected from the group consisting of French fries, potatoes, sweet potato fries, onion rings, cheese, beef, pork, chicken, fish, shrimp, lobster, oysters, eggs, jalapenos, potato chips, corn chips, tomatoes, vegetables, sushi rolls, ice cream, and candy.

In one embodiment, the disposable filter comprises a mesh of rayon fibers and polymer emulsion with a porosity selected to prevent small particles released from the cookable item from passing through the disposable filter. In another embodiment, the disposable filter comprises a mesh of rayon fibers and polymer emulsion with an air permeability of 440 CFM.

In still another embodiment of the invention, the disposable filter is adapted to a shape which covers a base and a side of a conventional, rectangular prism shaped fryer basket, the fryer basket further comprising an upper rim and a handle. In yet another embodiment, the disposable filter is adapted to a shape which covers a base and a side of a fryer basket comprising a nonconventional shape.

In another embodiment of the invention, the disposable filter is placed in connection with the fryer basket on the inside of the fryer basket. In yet another embodiment, the disposable filter is placed in connection with the fryer basket on the outside of the fryer basket.

In another embodiment, the disposable filter is held in place in the fryer basket by a filter securing element, the filter securing element being separate and removable from the fryer basket. In yet another embodiment the filter securing element is adapted to attach to the upper rim of the fryer basket. In still another embodiment the filter securing element is adapted to attach to the handle of the basket. In a further embodiment the filter securing element is a clip.

It is a further object of the present invention to provide an improved apparatus and method for filtering frying oil, while heated, without the need to alter the standard temperature or time of food preparation practices. In another embodiment, the disposable filter is adapted to withstand standard frying oil temperatures. In yet another embodiment, the disposable filter is adapted to allow frying oil to drain from the fryer basket at a substantially similar rate to that of the frying basket without the disposable filter.

Still another object of the present invention is to provide an improved apparatus and method for safe and inexpensive filtering of frying oil, representing a minimal impact on the cost and time required for filter maintenance relative to conventional systems and methods. In one embodiment, the disposable filter is utilized for a plurality of cooking sessions, the cooking session comprising immersion in heated fryer oil for an amount of time selected to cook a cookable item to a desired state, the desired state being based upon culinary value. In another embodiment of the invention, replacement of the disposable filter is performed by a user, during operation, without the need to cool or drain the frying oil pool.

In one embodiment, a conventional fryer basket is provided, comprising a wire mesh base, at least one wire mesh side wall, a handle, a substantially rigid upper rim, wherein the wire mesh base is connected to the at least one wire mesh side wall, the at least one wire mesh side wall is connected to the upper rim, and the upper rim is connected to the handle, and the filter securing element is adapted to attach to the upper rim and secure the disposable filter in connection with the wire mesh base and the wire mesh side.

In another embodiment the fryer basket comprises a rectangular prism shape wherein the wire mesh base comprises a rectangular, flat shape, and the at least one wire mesh side wall comprises four substantially rectangular, flat sides.

In yet another embodiment the fryer basket comprises a tapered cylinder shape, wherein the upper rim comprises a flat, circular shape, the wire mesh base comprises a flat, round shape, the diameter of the upper rim is equal to the diameter of the wire mesh base, and the at least one wire mesh side wall comprises a circular tube shape. In still another embodiment, the fryer basket comprises a tapered cylinder shape wherein the diameter of the upper rim is greater than the diameter of the wire mesh base.

In a further embodiment, the fryer basket comprises a substantially hemispherical shape wherein the wire mesh base and the at least one wire mesh side wall combine to comprise a hemispherical shape.

In another embodiment the filter securing element comprises a frame, the frame being substantially rigid and comprising a first side and a second side, the first side further comprising an attaching element, and the second side further comprising a latching element. The attaching element is adapted to securely connect the first side to the upper rim or the handle and allow the frame to move from a closed position to a first open position, and back to the closed position. The latching connection is adapted to securely connect the second side to the upper rim while the filter securing element is in the closed position, and to release the second side from the upper rim upon manipulation by a user, allowing the frame to move from the closed position to the first open position, and back to the closed position.

In yet another embodiment of the invention, the first side comprises a first latching connection and the second side comprises a second latching connection. The first latching connection is adapted to securely connect the first side to the upper rim and hold the frame in the closed position, and to release the first side from the upper rim upon manipulation by the user. The second latching connection is adapted to securely connect the second side to the upper rim and hold the frame in the closed position, and to release the second side from the upper rim upon manipulation by the user.

In still another embodiment of the invention, the first side comprises a first swinging latch connection, and the second side comprises a second swinging latch connection. The first swinging latch connection is adapted to securely connect the first side to the upper rim and allow the frame to freely swing from the closed position to the first open position, and back to the closed position. The first swinging latch connection is further adapted to release the first side from the upper rim upon manipulation by the user. The second swinging latch connection is adapted to securely connect the second side to the upper rim and allow the frame to freely swing from the closed position to a second open position, and back to the closed position. The second swinging latch connection is further adapted to release the second side from the upper rim upon manipulation by the user.

In another embodiment the frame is adapted to secure a disposable filter in place against the wire mesh base and the at least one wire mesh side wall while the frame is in the closed position, and move to the first open position or the second open position upon manipulation by the user to allow the user to quickly replace the disposable filter.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE SEVERAL VIEWS OF THE DRAWING

The techniques introduced here may be better understood by referring to the following Detailed Description in conjunction with the accompanying drawings, in which like reference numerals indicate identical or functionally similar elements:

FIG. 4(a) provides a general perspective view of tapered cylinder shaped components of the present invention with a permanently attached filter securing device in an open position, in accordance with a preferred embodiment of the present invention;

FIG. 4(b) provides a general perspective view of tapered cylinder shaped components of the present invention with a permanently attached filter securing device in a closed position, in accordance with a preferred embodiment of the present invention;

DETAILED DESCRIPTION OF THE INVENTION

Figure 1:
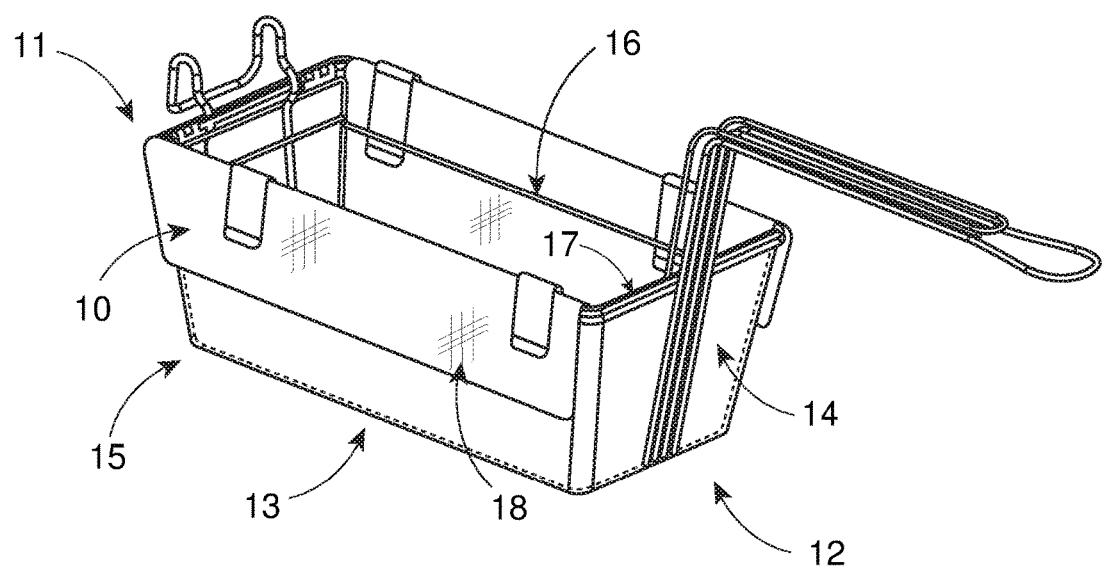
FIG. 1 provides a general perspective view of rectangular prism shaped components of the present invention with a permanently attached filter securing device in a closed position, in accordance with a preferred embodiment of the present invention.

Prior to proceeding to the more detailed description of the present invention it should be noted that, for the sake of clarity and understanding, identical components which have identical functions have been identified with identical reference numerals throughout the several views illustrated in the drawn figures.

Reference is now made, more particularly, to FIG. 1. A general perspective view of a preferred embodiment of the invention is provided, the invention comprising a disposable filter 10 and a filter securing element 16. In one embodiment the disposable filter 10 further comprises a rectangular prism shape 11. In another embodiment the disposable filter 10 comprises rayon fibers and polymer emulsion 18, the rayon fibers and polymer emulsion 18 comprising a substantially hydrophilic state. In yet another embodiment the filter securing element 16 is permanently attached to a fryer basket 12, the fryer basket 12 comprising a wire mesh base 13, a wire mesh side 14, a rectangular prism shape 15, and an upper rim 17.

Figure 2:
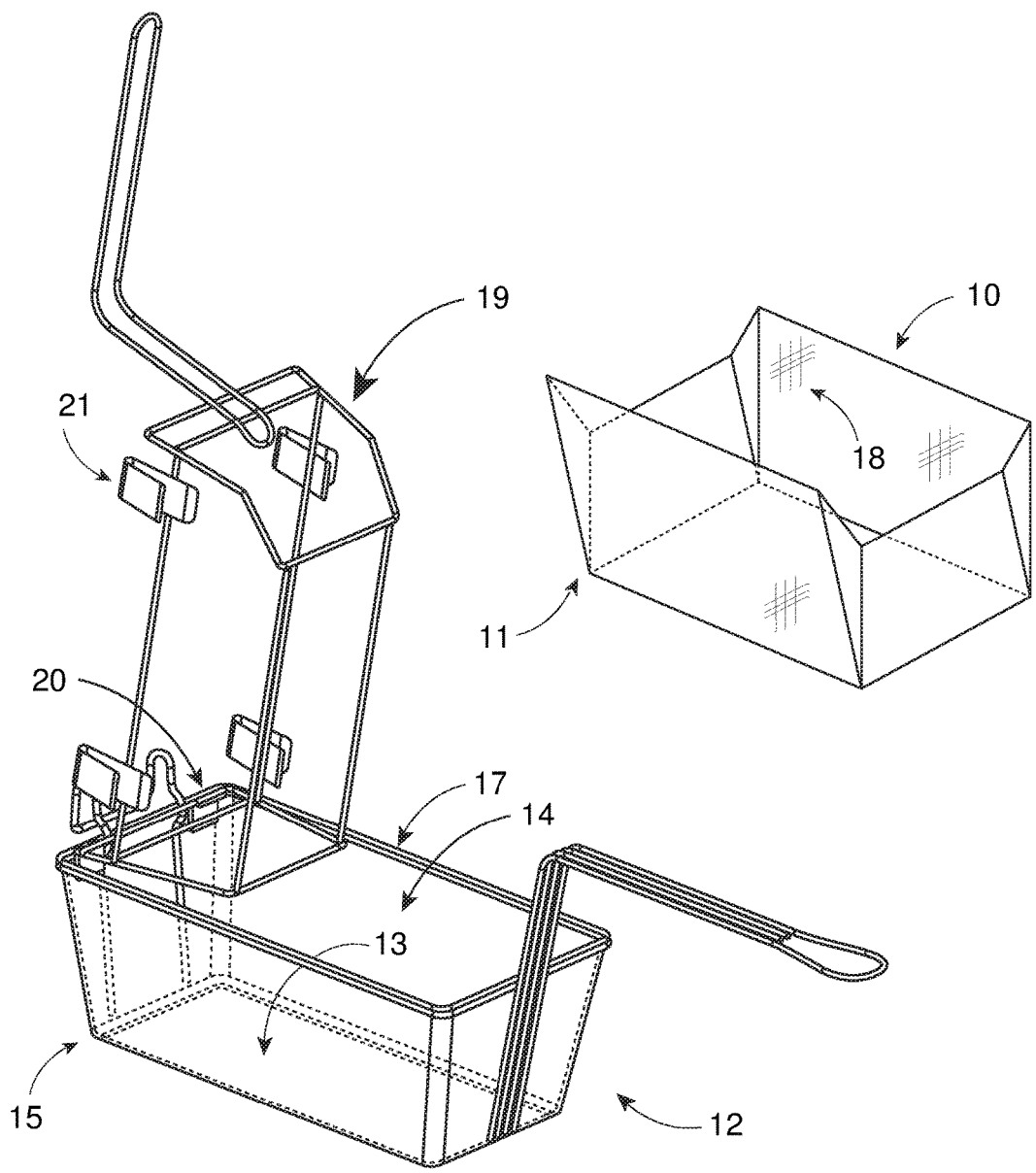
FIG. 2 provides a general perspective view of rectangular prism shaped components of the present invention with a permanently attached filter securing device in an open position, in accordance with a preferred embodiment of the present invention.

FIG. 2 provides a general perspective view of another embodiment of the invention wherein the filter securing element 16 comprises a frame 19. In one embodiment the frame 19 comprises an attaching element 20 and a latching element 21. In another embodiment the attaching element 20 comprises a hinge, the hinge being permanently attached to the upper rim 17, and adapted to allow the frame 19 to swing from an open position (see FIG. 2) to a closed position (see FIG. 1). In yet another embodiment the latching element 21 comprises a clip, the clip being adapted to latch to the upper rim 17 while the frame 19 is in the closed position, and to detach from the upper rim 17 while the frame 19 is in the open position.

Figure 3:
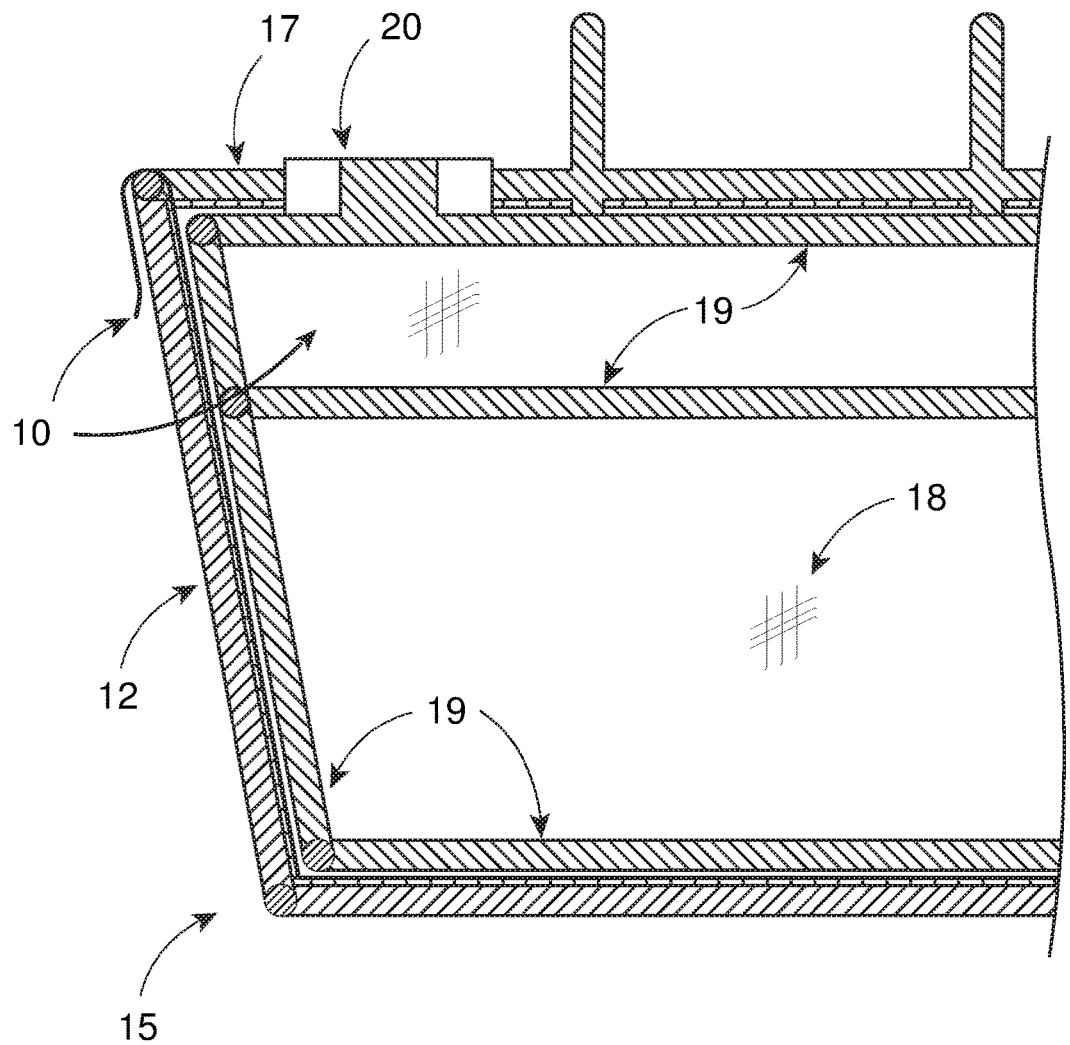
FIG. 3 provides a close-up cross-section view of rectangular prism shaped components of the present invention with a permanently attached filter securing device in a closed position, in accordance with a preferred embodiment of the present invention.

Reference is now made to FIG. 3, which provides a close-up, cross-section view of another embodiment of the invention wherein the frame 19 comprises the attaching element 20, the frame 19 being adapted to secure the disposable filter 10 in connection with the wire mesh base 13 and the wire mesh side 14 while in the closed position.

Reference is now made to FIG. 4. FIG. 4(a) provides a general perspective view of another embodiment of the invention wherein the disposable filter 10 comprises the rayon fibers and polymer emulsion 18 and a substantially tapered cylinder shape 24, and the frame 19 comprises the attaching element 20 and the latching element 21. In one embodiment the attaching element 20 comprises a coupling sleeve permanently attached to the fryer basket 12. In another embodiment the coupling sleeve is adapted to allow the frame 19 to slide from an open position (see FIG. 4(a)) to a closed position (see FIG. 4(b)). In yet another embodiment the latching element 21 comprises a clip, the clip being adapted to latch to the upper rim 17 while the frame 19 is in the closed position, and detach from the upper rim 17 when the frame 19 is in the open position. In still another embodiment the frame 19 is adapted to secure the disposable filter 10 in connection with the wire mesh base 13 and the wire mesh side 14 while in the closed position.

Figure 5:
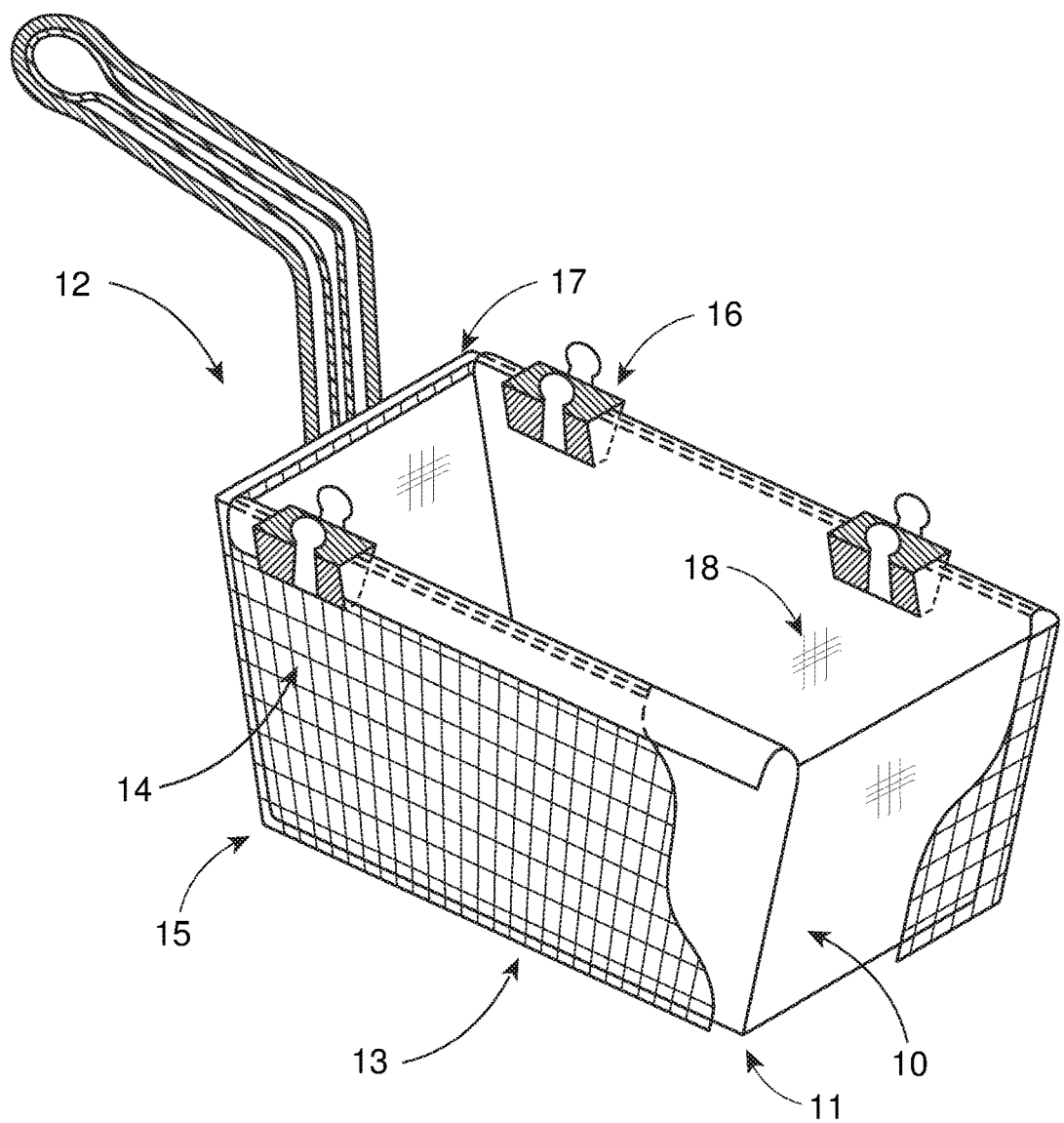
FIG. 5 provides a general perspective view of rectangular prism shaped components of the present invention with a detachable filter securing device, in accordance with an embodiment of the present invention.

Reference is now made to FIG. 5. In another embodiment the invention comprises the disposable filter 10 and the filter securing element 16, the disposable filter 10 comprising the substantially rectangular prism shape 11 and the rayon fibers and polymer emulsion 18, and the filter securing element 16 comprising a clip, the clip being separate and removable from the fryer basket 12. In one embodiment the clip is adapted to attach to the upper rim 17 and to secure the disposable filter 10 in connection with the wire mesh base 13 and the wire mesh side 14.

Figure 6:
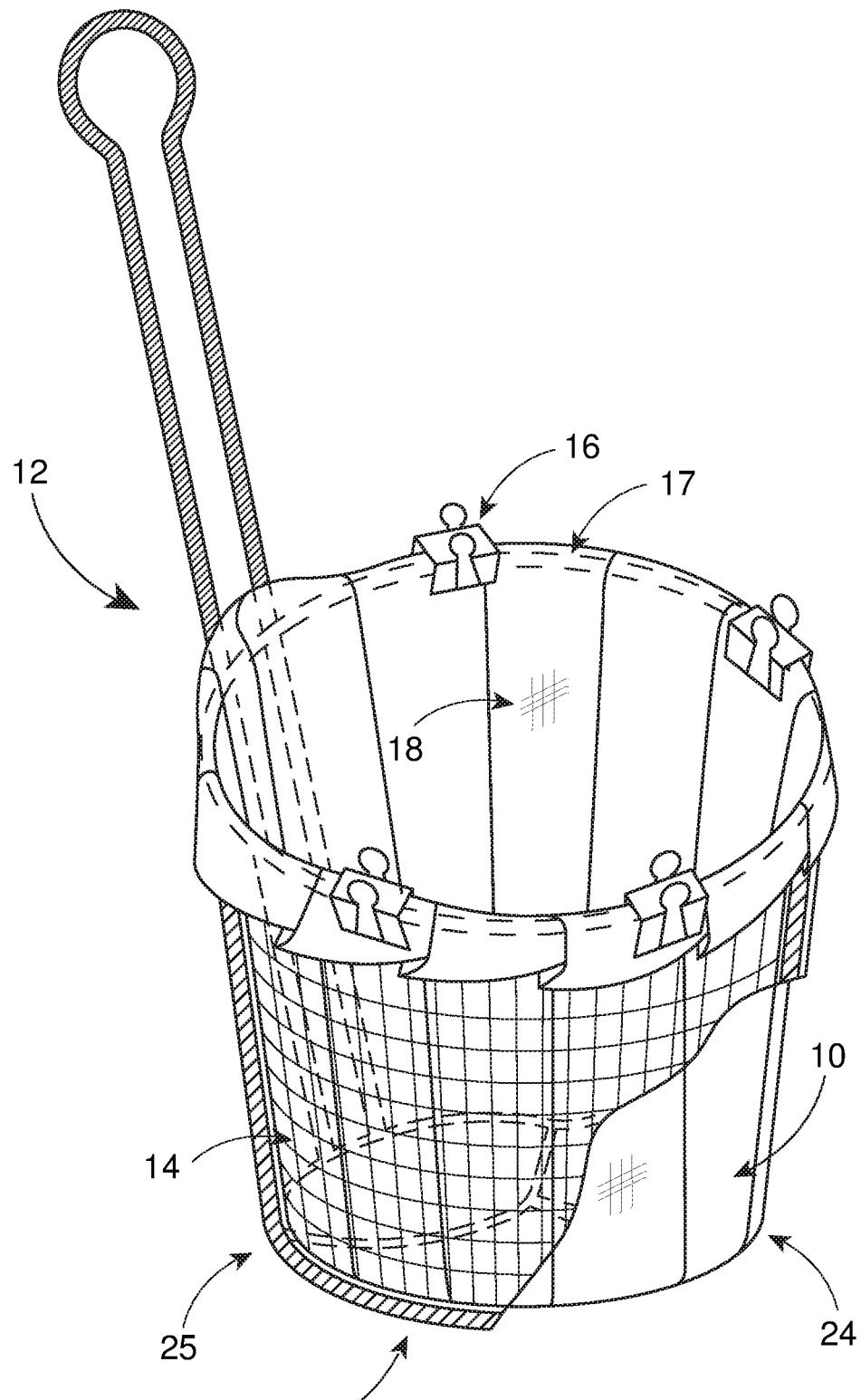
FIG. 6 provides a general perspective view of tapered cylinder shaped components of the present invention with a detachable filter securing device, in accordance with an embodiment of the present invention.

Reference is now made to FIG. 6. In another embodiment the invention comprises the disposable filter 10 and the filter securing element 16, the disposable filter 10 comprising the substantially tapered cylinder shape 24 and the rayon fibers and polymer emulsion 18, and the filter securing element 16 comprising the clip, the clip being separate and removable from the fryer basket 12. In one embodiment the clip is adapted to attach to the upper rim 17 and to secure the disposable filter 10 in connection with the wire mesh base 13 and the wire mesh side 14.

Figure 7A:
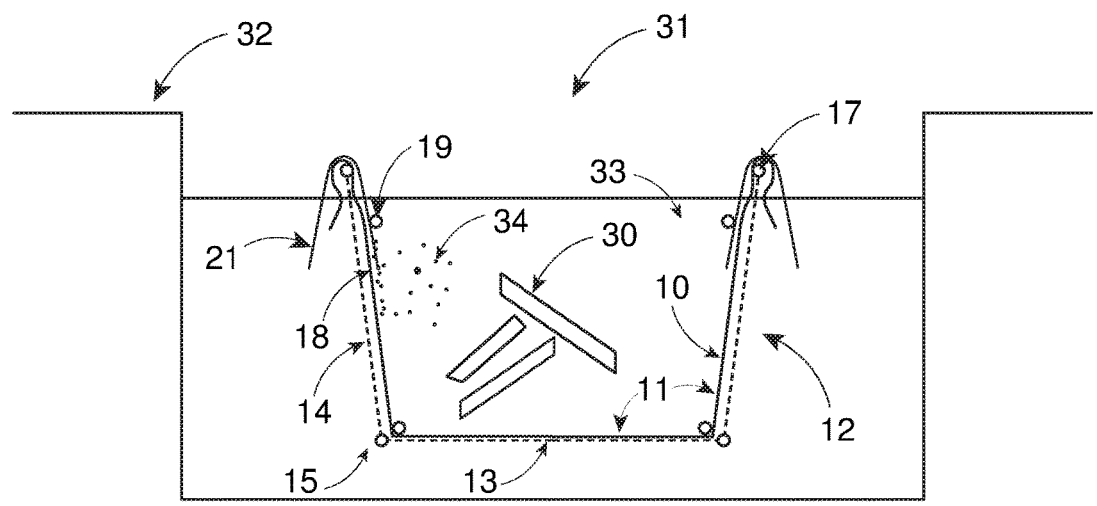
FIG. 7(a) provides a cross-section view of rectangular prism shaped components of the present invention with a permanently attached filter securing device, in a closed position, during a cooking session, in accordance with a preferred embodiment of the present invention.

Referring now to FIG. 7. FIG. 7(a) provides a cross-section view of an embodiment of the invention wherein the disposable filter 10 comprises the substantially rectangular prism shape 11 and the rayon fibers and polymer emulsion 18, and the filter securing element 16 comprises the frame 19, the frame comprising the latching element 21, the latching element comprising a clip, the clip being adapted to latch to the upper rim 17 while the frame 19 is in the closed position. In one embodiment the fryer basket 12 comprises the wire mesh base 13, the wire mesh side 14, and the rectangular prism shape 15, and the frame 19 is adapted to secure the disposable filter 10 in connection with the wire mesh base 13 and the wire mesh side 14. In another embodiment a cookable item 30 is placed in the fryer basket 12. The disposable filter 10, frame 19, fryer basket 12, and the cookable item 30 are collectively referred to as a cooking unit 31. In yet another embodiment the cooking unit 31 is immersed in a deep fryer 32 comprising a pool of heated frying oil 33, the pool of heated frying oil 33 comprising a temperature sufficient to cook the cookable item 30.

Figure 7B:
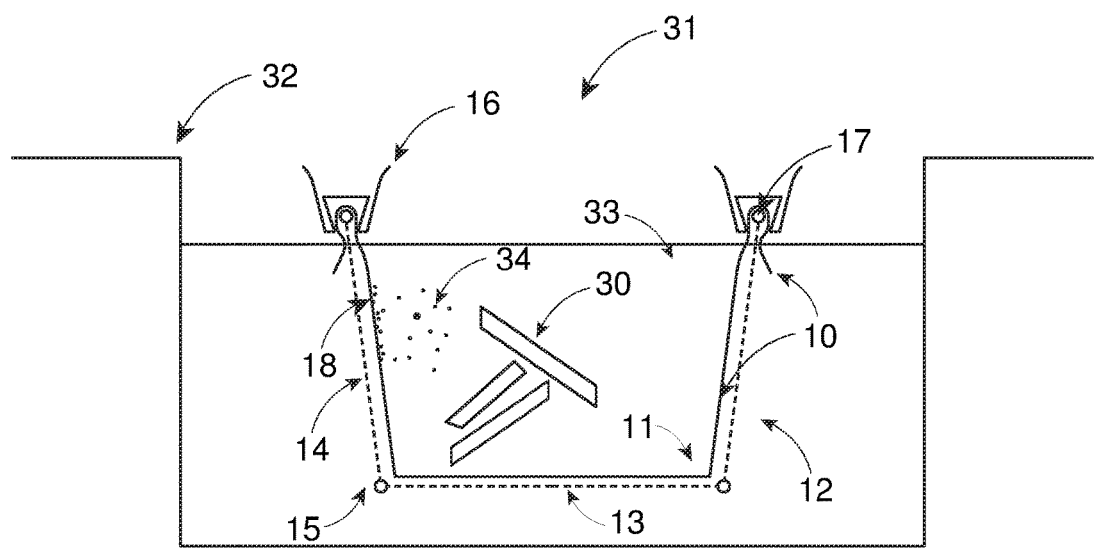
FIG. 7(b) provides a cross section view of rectangular prism shaped components of the present invention with a detachable filter securing device, during a cooking session, in accordance with an embodiment of the present invention.

FIG. 7(b) provides a corresponding cross-section view of an embodiment of the invention wherein the disposable filter 10 comprises the substantially rectangular prism shape 11 and the rayon fibers and polymer emulsion 18, and the filter securing element 16 comprises a clip, the clip being separate and detachable from the fryer basket 12. In one embodiment the disposable filter 10 is placed in connection with the fryer basket 12, the fryer basket 12 comprising the wire mesh base 13, the wire mesh side 14, the rectangular prism shape 15, and the upper rim 17. In another embodiment the filter securing element 16 holds the disposable filter 10 in connection with the fryer basket 12 at the upper rim 17, and the cookable item 30 is placed in the fryer basket 12. In yet another embodiment the cooking unit 31 comprises the disposable filter 10, filter securing element 16, fryer basket 12, and the cookable item 30. In a further embodiment the cooking unit 31 is immersed in the pool of heated frying oil 33, the pool of heated frying oil 33 comprising a temperature sufficient to cook the cookable item 30.

In another embodiment the cooking unit 31 is cooked for a cooking session, the cooking session comprising immersion in the pool of heated frying oil 33 for an amount of time selected to cook the cookable item 30 to a desired state, the desired state being determined by culinary value. In still another embodiment of the invention the disposable filter 10 provides a barrier to small particles 34, the small particles 34 being released from the cookable item 30 during the cooking session. In yet another embodiment the disposable filter 10 is adapted to prevent the small particles 34 from passing through the disposable filter 10 and becoming carbonized in the pool of heated frying oil 33, thus extending the utility of the pool of heated frying oil 33.

In one embodiment the disposable filter 10 comprises the mesh of rayon fibers and polymer emulsion 18, the rayon fibers and polymer emulsion 18 comprising a hydrophilic state and a porosity selected to prevent the small particles 34 from passing through the disposable filter 10. In still another embodiment, the mesh of rayon fibers and polymer emulsion 18 comprises an air permeability of 440 CFM.

Figure 8:
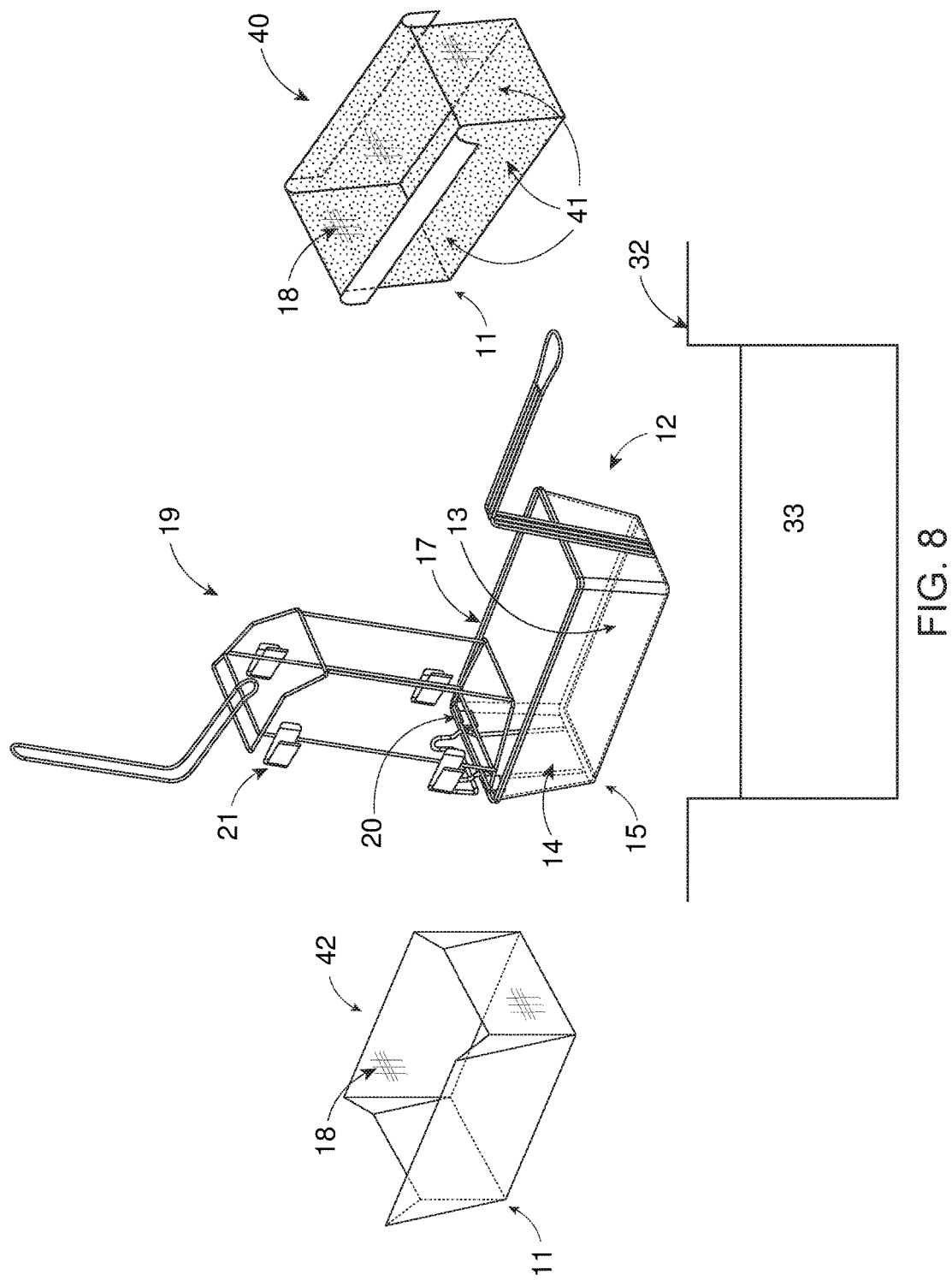
FIG. 8 provides a general perspective view of rectangular prism shaped components of the present invention with a permanently attached filter securing device in an open position, after a cooking session, in accordance with a preferred embodiment of the present invention.

Referring now to FIG. 8. A cross-section view is provided of the pool of heated frying oil 33 after the cooking session, the pool of heated frying oil 33 being free of the small particles 34. A general perspective view is also provided of a preferred embodiment of the present invention after the cooking session, the invention comprising the frame 19, a saturated disposable filter 40, and a fresh disposable filter 42. In one embodiment the saturated disposable filter 40 comprises the substantially rectangular shape 11, the rayon fibers and polymer emulsion 18, and absorbed small particles 41, the absorbed small particles 41 comprising a volume sufficient to reduce the rate of filtration of the pool of heated frying oil 33 through the saturated disposable filter 40. In another embodiment a plurality of cooking sessions is completed prior to the disposable filter 10 absorbing a volume of the small particles 34 sufficient for the disposable filter to become the saturated disposable filter 40.

In another embodiment the fresh disposable filter 42 comprises the substantially rectangular prism shape 11 and the rayon fibers and polymer emulsion 18. In yet another embodiment the frame 19 comprises the attaching element 20 and the latching element 21, the attaching element 20 comprising the hinge, the hinge being permanently attached to the upper rim 17.

In still another embodiment replacement of the saturated disposable filter 42 is performed by removing the cookable item 30 from the fryer basket 12, moving the frame 19 to the open position, removing the saturated disposable filter 40 from connection with the fryer basket 12, placing the fresh disposable filter 42 in connection with the fryer basket 12, and moving the frame 19 back to the closed position. In still another embodiment, the frame 19 secures the fresh disposable filter 42 in connection with the wire mesh base 13 and the wire mesh side 14 while in the closed position.

Figure 9:
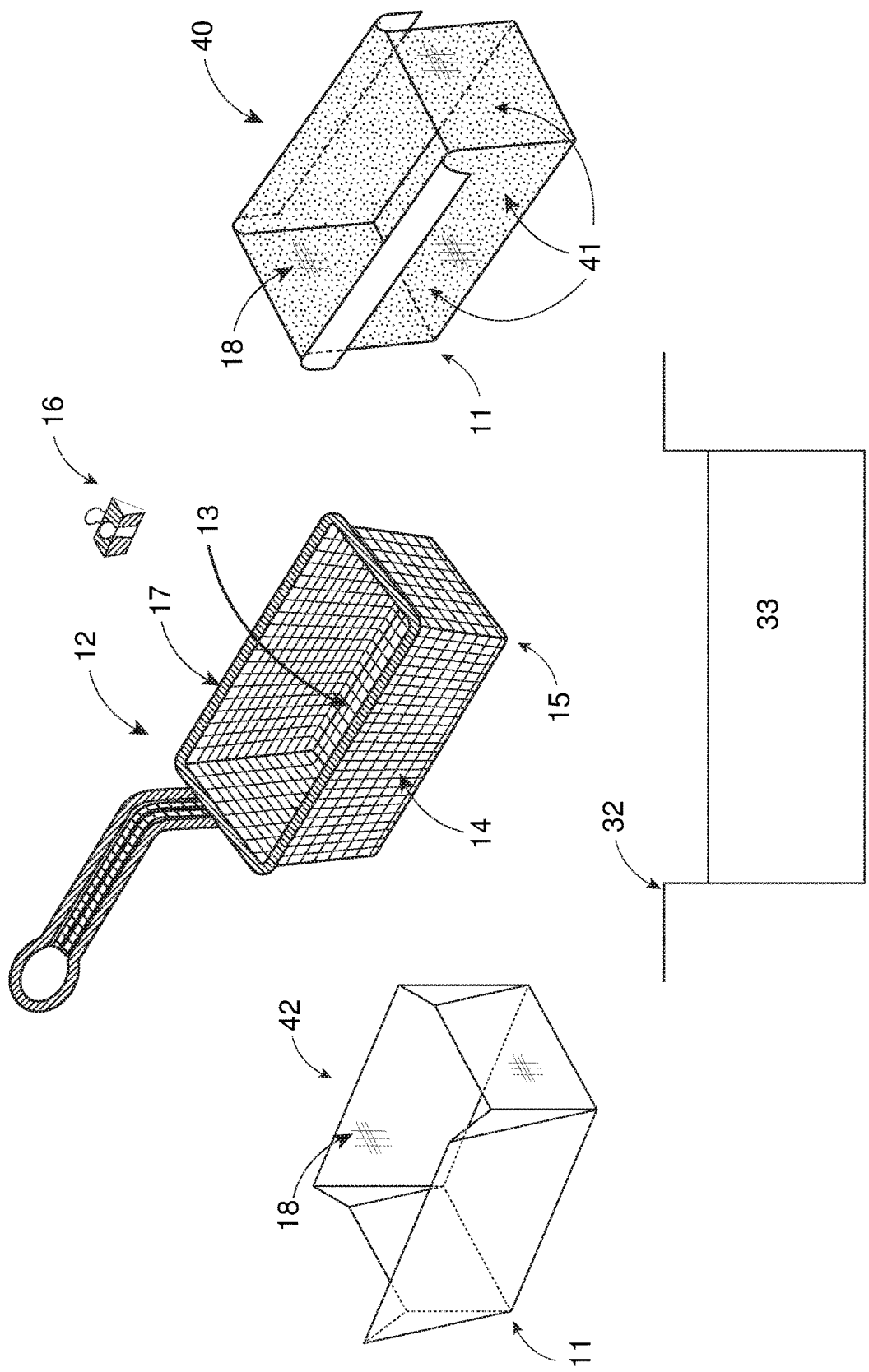
FIG. 9 provides a general perspective view of rectangular prism shaped components of the present invention with a detachable filter securing device, after a cooking session, in accordance with an embodiment of the present invention.

Referring now to FIG. 9. A cross-section view is provided of the pool of heated frying oil 33 after the cooking session, the pool of heated frying oil 33 being free of the small particles 34. A general perspective view is also provided of an embodiment of the present invention after the cooking session, the invention comprising the filter securing element 16, a saturated disposable filter 40, and a fresh disposable filter 42. In one embodiment the filter securing element 16 comprises the clip. In another embodiment a plurality of cooking sessions is completed prior to the disposable filter 10 absorbing a volume of the small particles 34 sufficient for the disposable filter to become the saturated disposable filter 40.

In another embodiment the saturated disposable filter 40 is replaced by removing the cookable item 30 from the fryer basket 12, detaching the filter securing element 16 from the upper rim 17, removing the saturated disposable filter 40 from connection with the fryer basket 12, placing the fresh disposable filter 42 in connection with the fryer basket 12, and attaching the filter securing element 16 to the upper rim 17.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, or processes described herein may be performed or implemented with one or more hardware modules, alone or in combination with other devices.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed:

1. A method for filtering frying oil in a deep fryer, the method comprising:
   providing a fryer basket, a non-metallic disposable filter comprising a hydrophilic material, a filter securing frame permanently attached to the fryer basket and comprising a latching element, a cookable item, and a deep fryer comprising a pool of heated frying oil, the disposable filter for preventing food particles from exiting the fryer basket while food is being cooked and comprising a shape which covers a base and a side of the fryer basket, and the filter securing frame being adapted to secure the disposable filter to the base and the side of the fryer basket, wherein the hydrophilic material comprises a single layer mesh of rayon fibers and polymer emulsion;
   placing the disposable filter in connection with the fryer basket to prevent particles released from the cookable item from exiting the fryer basket;
   latching the filter securing frame to the fryer basket so as to secure the disposable filter in connection with the fryer basket;
   placing the cookable item into the fryer basket;
   placing the fryer basket in the pool of heated frying oil for a cooking session so as to cook the cookable item;
   determining if the disposable filter is a saturated disposable filter after the cooking session; and
   for the saturated disposable filter, replacing the saturated disposable filter with a fresh disposable filter.

2. The method of claim 1, wherein the mesh of rayon fibers and polymer emulsion further comprises a porosity selected to prevent the particles released from the cookable item from exiting the fryer basket.

3. The method of claim 1, wherein the shape which covers a base and a side of a fryer basket further comprises a substantially rectangular prism shape.

4. The method of claim 1, wherein the shape which covers a base and a side of a fryer basket further comprises a substantially tapered cylinder shape.

5. The method of claim 1, wherein the filter securing frame is attached to the fryer basket via a hinge, the hinge being permanently secured to the fryer basket, and the latching element comprises a clip.

6. The method of claim 1, wherein the filter securing frame is attached to the fryer basket via a coupling sleeve, the coupling sleeve being permanently secured to the fryer basket, and the latching element comprises a clip.

7. The method of claim 1, wherein the mesh of rayon fibers and polymer emulsion further comprises an air permeability of approximately 440 CFM.

8. The method of claim 1, wherein the filter securing frame comprises a substantially rectangular prism shape.

9. The method of claim 1, wherein the filter securing frame comprises a substantially tapered cylinder shape.

10. The method of claim 1, wherein the polymer emulsion is integrated with a cross-hatch of the rayon fibers.

11. An apparatus for filtering frying oil in a deep fryer, the apparatus comprising:
   a non-metallic disposable filter for preventing food particles from exiting a fryer basket while food is being cooked and comprising a hydrophilic material and a shape which covers a base and a side of the fryer basket, wherein the hydrophilic material comprises a single layer mesh of rayon fibers and polymer emulsion, and
   a filter securing frame permanently attached to the fryer basket and comprising a latching element, the filter securing frame being adapted to secure the disposable filter to the base and the side of the fryer basket.

12. The apparatus of claim 11, wherein the mesh of rayon fibers and polymer emulsion further comprises a porosity selected to prevent particles released from a cookable item from exiting the fryer basket.

13. The apparatus of claim 11, wherein the mesh of rayon fibers and polymer emulsion further comprises an air permeability of approximately 440 CFM.

14. The apparatus of claim 11, wherein the shape which covers a base and a side of a fryer basket further comprises a substantially rectangular prism shape.

15. The apparatus of claim 11, wherein the shape which covers a base and a side of a fryer basket further comprises a substantially tapered cylinder shape.

16. The apparatus of claim 11, wherein the filter securing frame is attached to the fryer basket via a hinge, the hinge being permanently secured to the fryer basket, and the latching element comprises a clip.

17. The apparatus of claim 11, wherein the filter securing frame is attached to the fryer basket via a coupling sleeve, the coupling sleeve permanently secured to the fryer basket, and the latching element comprises a clip.

18. The apparatus of claim 11, wherein the filter securing frame comprises a substantially rectangular prism shape.

19. The apparatus of claim 11, wherein the polymer emulsion is integrated with a cross-hatch of the rayon fibers.

20. An apparatus for filtering frying oil in a deep fryer, the apparatus comprising:
   a non-metallic disposable filter for preventing food particles from exiting a fryer basket while food is being cooked and comprising a layer of hydrophilic material and a substantially rectangular prism shape which covers a base and a side of the fryer basket, the hydrophilic material comprising rayon fibers integrated with polymer emulsion and having an air permeability of approximately 440 CFM, and
   a filter securing frame adapted to secure the disposable filter to the base and the side of the fryer basket, the filter securing frame being permanently attached to the fryer basket via a hinge and comprising a substantially rectangular prism shape and a clip for reversibly latching the filter securing frame to the fryer basket in a closed position.

* * * * *